Jan. 14, 1964 H. WATSON 3,117,697
DISPENSER FOR FERTILIZER AND THE LIKE
Filed April 6, 1961 2 Sheets-Sheet 1
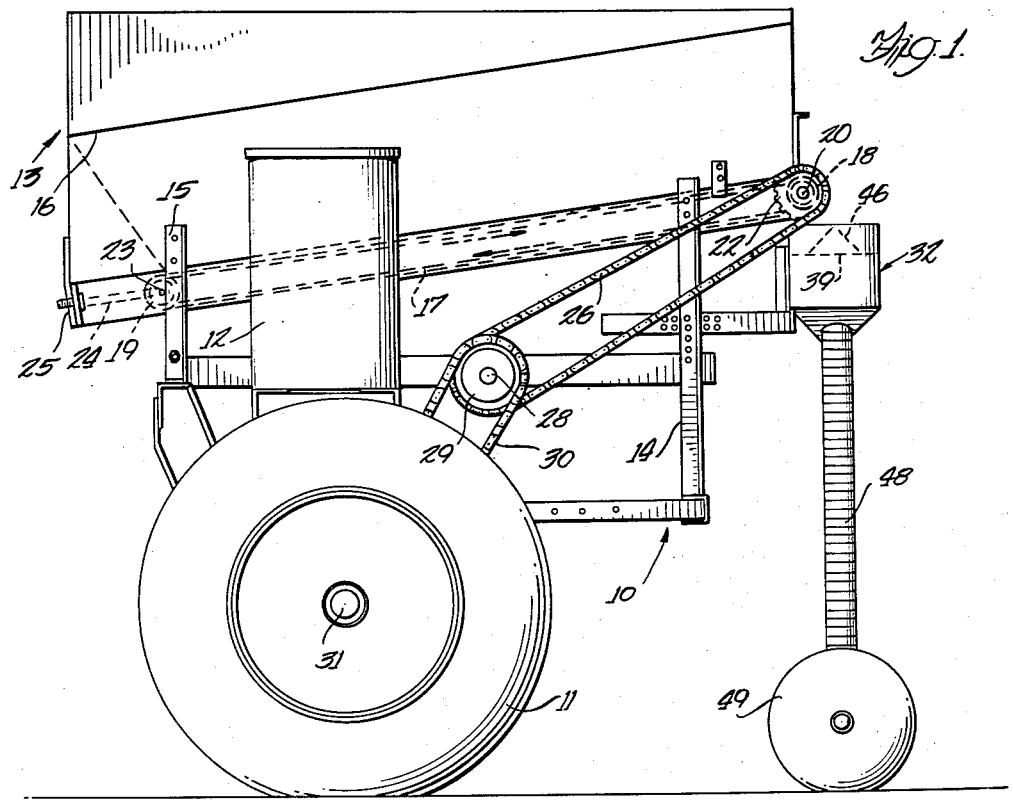
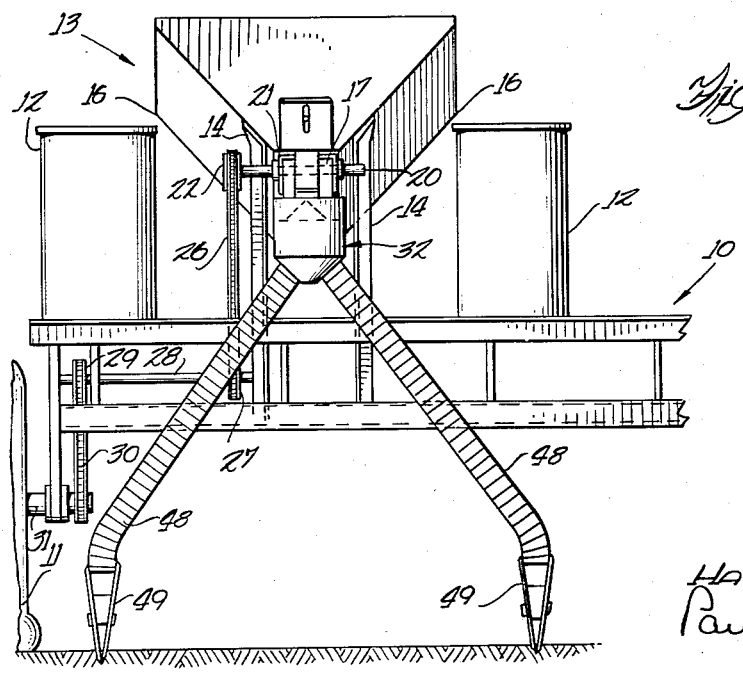
INVENTOR
HAROLD WATSON
Paul O. Pippel
ATTORNEY

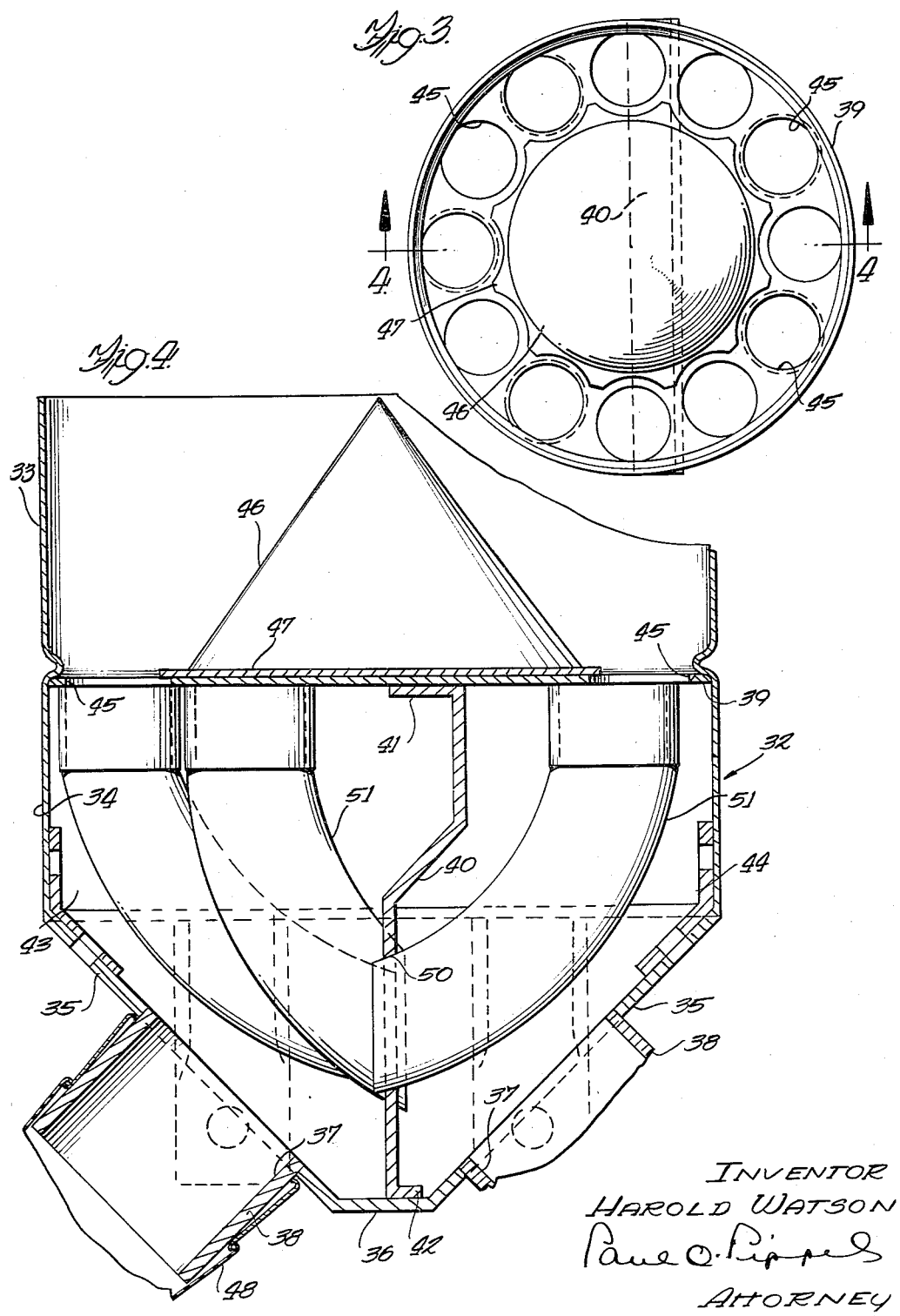

United States Patent Office 3,117,697
Patented Jan. 14, 1964

3,117,697
DISPENSER FOR FERTILIZER AND THE LIKE
Harold Watson, Naperville, Ill., assignor to International Harvester Company, Chicago, Ill., a corporation of New Jersey
Filed Apr. 6, 1961, Ser. No. 101,272
6 Claims. (Cl. 222—185)

This invention relates to agricultural implements and particularly to material dispensers such as planters, fertilizers and the like. More specifically, the invention concerns a fertilizer attachment for a row crop planter.

The depositing of fertilizer during planting and with the same machine by the addition to planters of fertilizer attachments, is common practice, and one of the problems is that of crowding separate fertilizer hoppers and dispensing elements into the space provided on the planter frame.

An object of this invention is therefore the provision of an improved planter with fertilizer attachment wherein the space on the machine is utilized with maximum efficiency and economy.

Another object of the invention is the provision of an improved fertilizer attachment for a row crop planter wherein a single hopper dispenses fertilizer to two crop rows.

Another object of the invention is the provision of an improved fertilizer distributor for crop rows wherein the hopper is of such a shape and is so disposed as to serve the rows seeded by separate planting units.

Another object of the invention is the provision of an improved distributor for fertilizer and the like wherein the dispenser includes means for substantially equally dividing the flow of fertilizer from the fertilizer hopper into two streams and discharging them to separate crop rows.

Another object of the invention is the provision of a novel fertilizer divider for discharging separate streams of fertilizer to adjacent crop rows wherein the fertilizer is received in a receptacle having circumferentially spaced openings in a base or shelf member therein, through which fertilizer passes into a space below, and the latter has a divider forming two compartments from which the fertilizer is separately discharged, intercommunication being provided between the shelf openings on one side of the divider and the compartment on the other side thereof to facilitate uniform distribution of the fertilizer to the crop rows.

Other objects and advantages of the invention will become clear from the following detailed description when read in conjunction with the accompanying drawings, wherein:

FIGURE 1 is a view in side elevation, with parts removed, of a planting machine having mounted thereon a fertilizer attachment incorporating the features of this invention;

FIGURE 2 is a front elevation of the structure shown in FIGURE 1;

FIGURE 3 is a plan view on an enlarged scale of a portion of the fertilizer divider apparatus, and FIGURE 4 is a section, further enlarged, taken on the line 4—4 of FIGURE 3.

In the drawings the numeral 10 designates a conventional planter frame of the transversely elongated type adapted to be mounted upon the rear of a tractor and having laterally spaced wheels 11, only one of which is shown. The planter frame and seed dispensing apparatus, per se, form no part of this invention although it should be understood that the frame 10 supports a plurality of laterally spaced seed hoppers 12, it being understood that the frame 10 is provided with any suitable hitch apparatus, not shown, for connection thereof to a tractor or the like, also not shown, for propelling the implement over the ground.

According to this invention a single fertilizer receptacle or hopper 13 is disposed between two cylindrical seed hoppers 12 and its forward end is mounted upon a pair of laterally spaced frame angle bars 14 and a pair of shorter angle bars 15 at the rear.

One of the problems involved in mounting fertilizer units on planters is that of keeping the height of the fertilizer hopper down to a level where it can be relatively easily reached by an operator hoisting a bag of fertilizer to fill the receptacle. Therefore, applicant has provided a longitudinally elongated hopper in order to provide sufficient capacity to serve two crop rows while keeping the height of the hopper at a minimum. As will be clearly seen in FIGURE 1, the vertical height of the rear wall of the hopper is greater than that of the front wall, while the lower portions of the side walls 16 of the hopper converge downwardly as indicated in FIGURE 2 to facilitate the feeding of fertilizer downwardly to a bottom opening extending substantially lengthwise of the hopper.

It will thus be seen that the bottom of the hopper is inclined upwardly from the rear thereof to the front, and below the bottom opening there is mounted an endless belt 17, substantially the length and width of the bottom opening and adapted to receive upon its surface and convey in the direction of the arrows the fertilizer in the hopper. The forward end of belt 17 is trained over a roller 18 and the rear end thereof over a similar roller 19. Roller 18 is mounted upon a shaft 20 carried by a bracket 21 affixed to the front hopper wall of the hopper and having mounted on one end thereof a sprocket wheel 22. Roller 19 at the rear end of the endless belt is mounted upon the transverse portion 23 of a U-shaped bolt 24, the ends of which are threaded and received in a lug 25 affixed to and depending from the rear wall of the hopper.

A drive chain 26 is trained around sprocket wheel 22 and around another sprocket wheel 27 mounted on a shaft 28 carried by the planter frame, and another sprocket wheel 29 mounted on shaft 28 is drivingly connected by a chain 30 with shaft 31 of wheel 11, so that rotation of wheel 11 drives the endless belt 17 in the direction of the arrows shown in FIGURE 1.

Fertilizer falling on belt 17 is carried thereby forwardly and upwardly to a discharge port or location represented by the forward end of the belt as it passes over roller 18. Fertilizer falls by gravity from the belt and is received in the open top of a receptacle 32 which is cylindrical and is divided into an upper section 33 and a lower section 34.

The lower portion of section 34 is provided with flattened downwardly converging wall sections 35 terminating in a bottom 36, each of said flattened wall portions 35 having an opening 37 in which is seated a short tube 38.

A circular member 39 forms a shelf or base for the upper section 33 of the receptable 32 and is supported by a generally vertical wall member 40 having an upper flange 41 affixed to the member 39 and a flange 42 at its lower end secured to the bottom 36.

Wall 40 serves as a divider to separate the lower section 34 of the receptacle 32 into compartments 43 and 44.

As shown clearly in FIGURE 3, base or shelf member 39 is provided with a plurality of openings 45, twelve such openings being shown.

Mounted upon the central portion of the base 39 is a cone-shaped member 46 having a base 47 scalloped to conform to the shape of the openings 45.

Fertilizer discharged by gravity from the forward end of belt 17 falls upon the apex of the cone 46 and slides downwardly therealong and passes through openings 45 into compartments 43 and 44 therebelow. The wall 40 for convenience extends in a straight line in a horizontal plane, and to avoid bisecting the openings 45, is disposed on one side of the center, although, if desired, the wall could angle to provide an even number of openings on each side of the wall.

Fertilizer flowing substantially uniformly around the cone 46 passes through openings 45 into the compartments 43 and 44 whence it is discharged through outlet 37. Flexible tubes 48 have their upper ends slipped over the short tubes 38 and extend downwardly, as indicated in FIGURE 2, at approximately 45° angles. The lower ends of the tubes are connected to furrow openers 49 through which the fertilizer is deposited in the ground.

The height of the receptacle 32 with respect to the ground is limited by the requirement that it be as near as possible to the discharge end of the conveyor for maximum efficiency in transferring fertilizer to the receptacle. The height of the receptacle is also limited by the length of the guide tubes, it being understood that the shorter the tube the more efficient the passage of fertilizer from hopper to ground. The angle the guide tube makes with the ground is also of considerable importance, to the extent that the greater this angle the more efficient the passage of fertilizer therethrough. Thus, it has been found that if this angle is less than 45° the efficiency of fertilizer passage is substantially impaired. Therefore, it is impractical to lower the position of receptacle 32 to provide greater capacity in the hopper without increasing the overall height. However, substantial capacity is achieved by providing a hopper having greater depth at its rear portion, the hopper having lesser depth at its front end where transfer is made of fertilizer from the hopper to the receptacle 32.

Since the amount of the fertilizer discharged upon the conical member 46 does not always uniformly flow down the sides thereof and pass in uniform quantities through the openings 45, provision is made by the present invention to compensate for such variations. Without such provision, where the flow of fertilizer onto conical member 46 is uniform, and in the absence of the wall 40, uniform quantities would flow to the outlets 37. However, since the flow of fertilizer down the sides of cone 46 is not always uniform; that is, more fertilizer flows down one side than another and would normally be directed to the nearest of the outlets 37, such inbalance is compensated for by forcing some of the fertilizer passing through openings 45 on one side of the receptacle to follow a path that will lead it to the other of the outlets 37. The lower portion of wall 40 is therefore provided with a number of apertures 50 whereby a preponderance of fertilizer received by shelf 39 on one side of wall 40 will not all flow into one of the compartments 43 and 44 and be discharged through one of the outlets 37. Provision of the several openings 50 allows communication between the compartments 43 and 44. In other words, viewing the receptacle 32 as seen in FIGURE 4, should a preponderance of fertilizer leaving hopper 13 slide down the left hand side of cone 46, more fertilizer would pass through the left hand openings 45 in shelf 39 and through the left hand discharge outlet, while little or no fertilizer reaches the right hand outlet 37. When this happens, of course, the furrow fed by the tube connected to left hand outlet 37 receives more fertilizer than the furrow fed by the tube connected to right hand outlet 37. By providing the wall 40 with openings 50 therein, some of the excessive amount of fertilizer on the left hand side of the wall will pass through the openings 50 into the compartment on the right hand side of the wall and find its way to the right hand outlet 37. In order to insure uniform distribution of fertilizer through openings 45 into the compartments 43 and 44, certain of the openings 45 in shelf 39 are connected by flexible tubes 51 with the openings 50. In the example shown in FIGURES 3, three tubes are provided on one side of the wall 40 and two on the other so that under no circumstances will one or the other of the compartments 43 and 44 discharge substantially more fertilizer into the tubes 48 than the other.

It will be observed from FIGURE 3 that, as pointed out before, more openings 45 in shelf 39 are on the left hand side of wall 40 than on the other, so that more fertilizer would normally flow into left hand compartment 43 than into compartment 44. This is offset by the provision of three tubes 51 connecting three openings 45 to openings 50 for discharging fertilizer on the left hand side of shelf 39 into right hand compartment 44, while only two tubes connect openings 45 on the right hand side of the shelf to the left hand compartment 43.

the apparatus of this invention will be clearly understood from the foregoing description. It should likewise be understood that the invention has been described in its preferred embodiment and that modifications may be made in the invention without departing from the spirit thereof or the scope of the appended claims.

What is claimed is:

1. Apparatus for dispensing fertilizer and the like from a single hopper to spaced crop rows, comprising a frame, a hopper mounted on the frame having means for discharging fertilizer therefrom, a cylindrical open top receptacle mounted on the frame having upper and lower sections and a circular shelf dividing the upper section from the lower section, said shelf having a central conical portion disposed in the path of fertilizer discharged from said outlet, an annular flat portion between the base of the conical portion and the wall of the receptacle, said annular flat portion having a plurality of circumferentially spaced openings through which fertilizer flows, a vertical divider wall mounted in said lower section to separate the latter into compartments connecting only with openings in the shelf on opposite sides of said wall, and an outlet formed in each of said compartments for directing fertilizer received therein to separate crop rows.

2. Apparatus for dispensing fertilizer and the like from a single hopper to spaced crow rows, comprising a frame, a hopper mounted on the frame having means for discharging fertilizer therefrom, a cylindrical open top receptacle mounted on the frame having upper and lower sections and a circular shelf dividing the upper section from the lower section, said shelf having a central conical portion disposed in the path of fertilizer discharged from said outlet, an annular flat portion between the base of the conical portion and the wall of the receptacle, said annular flat portion having a plurality of circumferentially spaced openings through which fertilizer flows, a vertical divider wall mounted in said lower section to separate the latter into compartments connecting only with openings in the shelf on opposite sides of said wall, and an outlet formed in each of said compartments for directing fertilizer received therein to separate crop rows, said divider wall having apertures therein, whereby some of the fertilizer falling through openings on one side of said wall passes through said apertures.

3. Apparatus for dispensing fertilizer and the like from a single hopper to spaced crop rows, comprising a frame, a hopper mounted on the frame having means for discharging fertilizer therefrom, a cylindrical open top receptacle mounted on the frame having upper and lower sections and a circular shelf dividing the upper section from the lower section, said shelf having a central conical portion disposed in the path of fertilizer discharged from said outlet, an annular flat portion between the base of the conical portion and the wall of the receptacle, said annular flat portion having a plurality of circumferentially spaced openings through which fertilizer flows, a vertical divider wall mounted in said lower section to separate the latter into compartments connecting only with openings in the shelf on opposite sides of said wall, and an outlet formed in each of said compartments for directing fertilizer received therein to separate crop rows, said divider wall having apertures therein, and guide tubes connected at one end to certain of said openings in the shelf on opposite sides of said wall and at the other end to said apertures whereby part of the fertilizer received by said shelf on each side of said wall is directed to both of said outlets.

4. In apparatus for dispensing fertilizer and the like from a single hopper to spaced crop rows, a frame, a hopper mounted on the frame having means for discharging fertilizer therefrom in a single stream, and means for separating the fertilizer into two streams, comprising an open top receptacle mounted on the frame in the path of the fertilizer discharged from the hopper and having a base upon which the fertilizer falls, said base having circumferentially spaced openings therein to allow fertilizer to fall through, a vertically extending divider wall mounted in the receptacle in the space below said base to divide said space into compartments each communicating with certain of the openings in said base to selectively receive fertilizer therefrom, and an outlet in each said compartment for discharging fertilizer therefrom.

5. In apparatus for discharging fertilizer and the like from a single hopper to spaced crop rows, a frame, a hopper mounted on the frame having means for discharging fertilizer therefrom in a single stream, and means for separating the fertilizer into two streams, comprising an open top receptacle mounted on the frame in the path of the fertilizer discharged from the hopper and having a base upon which the fertilizer falls, said base having circumferentially spaced openings therein to allow fertilizer to fall through, a vertically extending divider wall mounted in the receptacle in the space below said base to divide said space into compartments each communicating with the openings in the shelf on opposite sides of said base, said divider wall having a plurality of apertures therein, and conduit means connecting certain of said openings on each side of said base with the apertures in said wall, whereby some of the fertilizer falling through the openings on one side of said base is directed to the compartment communicating with the openings in the other side of said base.

6. The invention set forth in claim 5, wherein a conically shaped member is mounted on said base in the path of the fertilizer discharged from said hopper to facilitate the feeding of fertilizer uniformly to said openings.

References Cited in the file of this patent
UNITED STATES PATENTS

| | | |
|---|---|---|
| 149,278 | Couteau | Mar. 31, 1874 |
| 791,425 | Johnson | May 30, 1905 |
| 841,833 | Warner | Jan. 22, 1907 |
| 2,380,712 | Walborn | July 31, 1945 |
| 2,612,294 | Dorschner | Sept. 30, 1952 |
| 2,745,795 | Penick | May 15, 1956 |
| 2,827,210 | Ballard | Mar. 18, 1958 |
| 2,960,261 | Stenberg | Nov. 15, 1960 |